United States Patent [19]
Berger

[11] Patent Number: 5,978,841
[45] Date of Patent: Nov. 2, 1999

[54] LOOK AHEAD CACHING PROCESS FOR IMPROVED INFORMATION RETRIEVAL RESPONSE TIME BY CACHING BODIES OF INFORMATION BEFORE THEY ARE REQUESTED BY THE USER

[76] Inventor: Louis Berger, 5308 King Charles Way, Bethesda, Md. 20814

[21] Appl. No.: 08/813,544

[22] Filed: Mar. 7, 1997

Related U.S. Application Data

[60] Provisional application No. 60/013,095, Mar. 8, 1996.

[51] Int. Cl.[6] .................................................. G06F 13/00
[52] U.S. Cl. ..................... 709/217; 709/213; 709/216; 709/218
[58] Field of Search .................... 395/200.43, 200.46, 395/200.47; 711/118, 137; 709/213, 216, 217, 218

[56] References Cited

U.S. PATENT DOCUMENTS

| | | | |
|---|---|---|---|
| 5,305,389 | 4/1994 | Palmer | 382/305 |
| 5,485,609 | 1/1996 | Vitter et al. | 707/101 |
| 5,749,080 | 5/1998 | Matsumoto et al. | 707/100 |
| 5,768,578 | 6/1998 | Kirk et al. | 707/100 |
| 5,802,292 | 9/1998 | Mogul | 709/203 |

*Primary Examiner*—Zarni Maung
*Assistant Examiner*—Jason D Cardone
*Attorney, Agent, or Firm*—McDermott, Will & Emery

[57] ABSTRACT

Improvement in perceived user response time for information requests is achieved by preloading information in anticipation of a user request. The preloaded information is stored in a look-ahead cache from which it is presented to a user when it is ultimately requested by the user. If preloaded information is requested by a user, it can be presented almost immediately without the latency of a network retrieval. Techniques for optimizing preloading are disclosed. Flexibility in preloading is achieved by organizing information identifiers into a data structure, such as a stack, for preload retrieval, and by limiting the types of information which can be preloaded and by specifying the order in which information types are accessed. Preloading can be implemented on a wide variety of platforms and can be incorporated in a variety of software processes.

36 Claims, 16 Drawing Sheets

LOOK AHEAD CACHING PROCESS FOR IMPROVED INFORMATION RETRIEVAL RESPONSE TIME BY CACHING BODIES OF INFORMATION BEFORE THEY ARE REQUESTED BY THE USER

CROSS-REFERENCE TO RELATED APPLICATION

This application claims priority to U.S. Application Ser. No. 60/013,095, filed Mar. 8, 1996 in the name of Louis Berger, which is hereby incorporated by reference herein in its entirety.

BACKGROUND OF THE INVENTION

Information retrieval systems have evolved from dedicated hosts and connected terminals to vast networks such as the World Wide Web. Information viewers, such as web browsers, are known, typically as client processes in a network environment, which provide access to information maintained on other computers.

Information viewers are software packages that enable a user to retrieve and display information from distributive network sources. Network sources may be a local computer, computers on a private or corporate local/wide area network, or even computers distributed across the globe. The collection of information that is distributed across the globe and is available for retrieval over the Internet via a specific set of "Internet" protocols is commonly referred to as the World Wide Web. Information is retrieved using a number of standardized network protocols including, but not limited to HTFP, FTP, NNTP Gopher and WAIS. Retrieved information also takes many forms, some examples being HTML, ASCII text, SGML and GIF and JPEG images.

Information retrieval systems unrelated to the World Wide Web also exist. These systems enable users to retrieve and display information from network sources. Typically, these use proprietary protocols and custom information formats. All use some software to interface with and to display information to users. On line information services are common examples of such systems. A common feature of these systems is the use of structured information languages, such as the World Wide Web's HTML, which contain links to related information embedded in the information itself.

Information viewers, especially web browsers, have many product distinguishing features, but all share the basic ability to retrieve and display network based information. The most sophisticated viewers are able to display graphics, richly formatted text, simultaneously load and display information, and maintain caches of retrieved information for rapid redisplay.

User requests for information may be processed in a network by information proxies. Information proxies are software packages that are installed in the network infrastructure to provide one or more information related services. Services are typically provided based on network policies, or to overcome restrictions in network infrastructure. Some of the common reasons for the use of proxies are: security, access control, IP address translation/hiding, limiting access to inappropriate information and information caching. Proxies may be installed in stand-alone or multi-use computers. In the multi-use environment, proxies and viewers may run on the same computer. Like information viewers, proxies have many product distinguishing features. Proxies typically support multiple users by providing for the simultaneous loading of multiple sets of information. Many also cache information for reuse by any of the users being served by the proxy.

User requests for network based information network must be handled by network access mechanisms. All hardware platforms use software to provide the basic network capabilities. The protocols are typically implemented in a "protocol stack" which implements the particular interactions required for network communications. Network software may be included as part of the operating system or may be obtained as an add-on product. Network software has different labels based on specific implementations and capabilities. Some common labels are "network operating systems", "operating systems", "network protocol stack" or even "middleware." Network software is typically hidden from the user, especially in an on-line service information system. Network software uniformly provides access to connected networks and typically provides support for multiple simultaneous user, as well as an application programmer interface (API) for general use by applications. Some examples of API's are WINSOCK and UNIX SOCKETS.

The Problems

In prior art network based information retrieval systems, a user requests information, views the information, and after completing review of the information, requests to view more information based on a link contained in the reviewed information. The new request for information is then retrieved from the network information source. During retrieval time, the user must wait, while the information is retrieved The interval that the user waits for requested information retrieval is wasteful, results in less productivity and, at the very least, causes boredom.

To address this problem many modern information viewers maintain local copies, or caches of information that has been retrieved by a user for possible later reuse by the user. When the user elects to view information that is stored in local cache, the information can be displayed more rapidly since it is not necessary to re-retrieve the information from the network. Such caches improve user perceived response time, but only for such information that the user has previously requested. Unfortunately only a limited set of information is re-requested by the user and such caches don't improve response time for new information retrieval requests.

SUMMARY OF THE INVENTION

The invention overcomes the problems of the prior art by providing improvement in response time to the user by preloading information before it is requested by the user. This permits the information to be rapidly displayed without remote network retrieval, once it is requested by the user. Information is preloaded based on information that has previously been requested by the user. Preloading takes place while the user is reviewing displayed information. A cache of local copies of preloaded information for possible viewing by the user is described in this document as a look-ahead cache. The invention defines a look-ahead caching process or LCP for short.

Look-ahead caching is only useful if the preloaded information is subsequently requested by the user. An LCP uses information previously requested by the user to improve the probability that a future user request will match preloaded information.

It is possible to preload a huge amount of information from network sources, especially in the case of the World Wide Web or on-line services. LCP limits preloaded information to a reasonable amount through a combination of factors.

The invention is directed to apparatus for improving user perceived response time when retrieving information from an information system, including a computer, a program, running on the computer retrieving information from the information system, and a process, running on the computer, predicting anticipated user retrievals from the information system and retrieving one or more anticipated user retrieval requests before they are requested by the user.

The invention is also directed to a method for improving user perceived response time when retrieving information from an information system, by extracting information identifiers from a user requested retrieval, and preloading information identified by at least one information identifier before it is requested by a user.

The invention is also directed to a system for improving user perceived response time when retrieving information over a network, including a network, at least one computer delivering information over the network upon request, and at least one computer operated by a user for accessing information over the network, the at least one computer operated by a user predicting anticipated user retrievals over the network and retrieving one or more anticipated user retrieval requests before they are requested by the user.

The invention is also directed to a computer program product for improving user perceived response time when retrieving information from an information system, having a memory medium, and a computer program stored on the memory medium, the computer program including instructions for extracting information identifiers from a user requested retrieval and for preloading information identified by at least one information identifier before it is requested by a user.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1A:
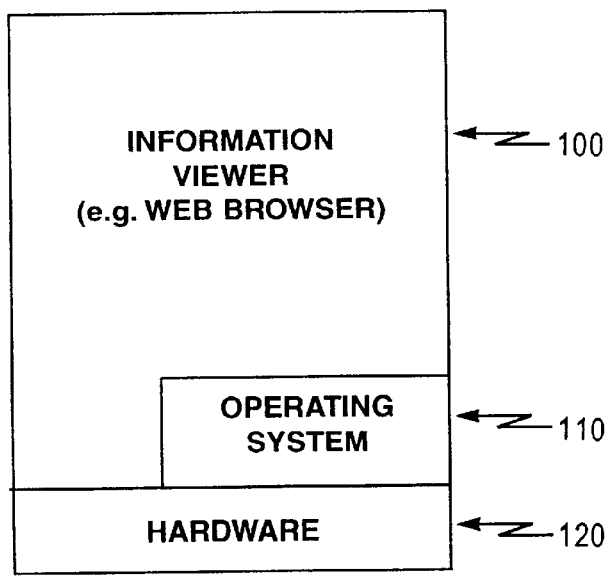
FIG. 1A is a block diagram illustrating a software architecture including an information viewer useful for carrying out the invention.

Look-ahead caching process (LCP) permits information to be preloaded in advance of a user request to achieve a user perceived improvement in response time.

Look-ahead caching is only useful if the preloaded information is subsequently requested by the user. An LCP uses information previously requested to improve the probability that a future user request will match preloaded information. An LCP can be implemented on any general purpose computer such as PC's, PC compatibles, MacIntoshes and UNIX computers. LCP may also be implemented in platforms dedicated for information retrieval.

There are several software platforms suitable for use in implementing an LCP. The three most likely platforms are information viewers, information proxies and network protocol stacks. Different software platforms may make sense for different applications. The information viewer is considered the best platform for most uses. The two most suitable viewers are World Wide Web browsers and on-line service front ends. The primary reason for this is that the use of LCP with information viewers introduces the smallest change in configuration requirements and provides the highest ease of use out of all other platforms. One drawback of integration of an LCP with a viewer is that it needs to be integrated with each viewer and, therefore, caches will be maintained on a per user basis.

Incorporation of LCP into information proxies may be desirable since a single proxy could provide LCP benefits to all viewers that use the proxy without having to incorporate LCP into each viewer. This is especially true for Web proxies and Web viewers. There is also the added possible benefit that all users will share the same cache.

An LCP may be incorporated into Middleware or network stacks. One issue with this approach is that there area a large number of network stacks that would need to be modified to incorporate information system (e.g. Web) specific and LCP related code. The benefits seen in this approach are the ability to provide LCP without any viewer modifications, and the possibility of sharing a cache between multiple users.

This document will use the web browser platform to illustrate the look-ahead cache process. However, it is possible to implement LCP with other information retrieval systems including, but not limited to, those provided by on-line services.

For illustrative purposes, a specific example of the network information viewer is used in the implementation reference model. The implementation reference model presumes a World Wide Web browser is used as a potential platform and that the web browser implements certain state of art functions. In the presented reference model, these functions have been distributed across a set of software modules. These functions may not truly exist in all information viewer products. Further, when the functions do exist, the module breakdown of viewer products may not match the reference modules. Even though this may be the case, LCP may be integrated into any information viewer, even those that do not use web technology, and the process embodied reference modules may be applied.

FIG. 1A is a block diagram illustrating a software architecture including an information viewer useful for carrying out the invention. An information viewer 100, such as a web browser, runs an application on hardware platform 120. The information viewer may access the capabilities of the hardware through an operating system 110 or by directly accessing hardware. In one implementation, the hardware includes a network interface over which information is retrieved either utilizing the services of the operating system 110 or by direct access to the network interface without the intervention of the operating system. The latter is sometimes done to optimize performance when the operating system is considered limiting.

Figure 1B:
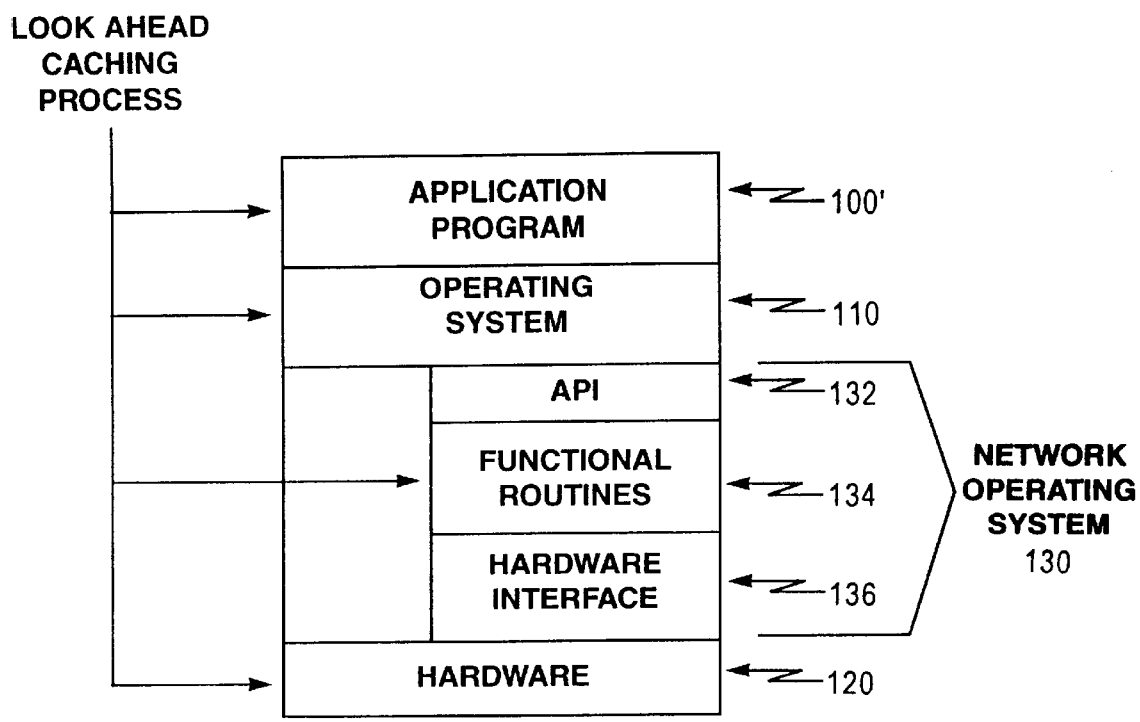
FIG. 1B is a block diagram of a more general software architecture useful for carrying out the invention.

FIG. 1B is a block diagram of a more general software architecture useful for carrying out the invention. In the example shown, an application program 100' may be any program in need of information. It is thus, more general than the information viewer 100 of FIG. 1A which is really just a special case of FIG. 1B. The operating system 110 provides convenient access to the application program to computer and network services in the hardware 120 either directly or through the services of a network operating system 130. The network operating system 130 is illustrated as having an application programmer interface 132, a plurality of functional routines 134 which can be accessed over the API 120 and a hardware interface 136 which are utilized by the functional routines 134 to access network services, inter alia. The look-ahead caching process (LCP) of the invention can be implemented in the application program, the operating system, the network operating system or in the hardware.

Figure 2:
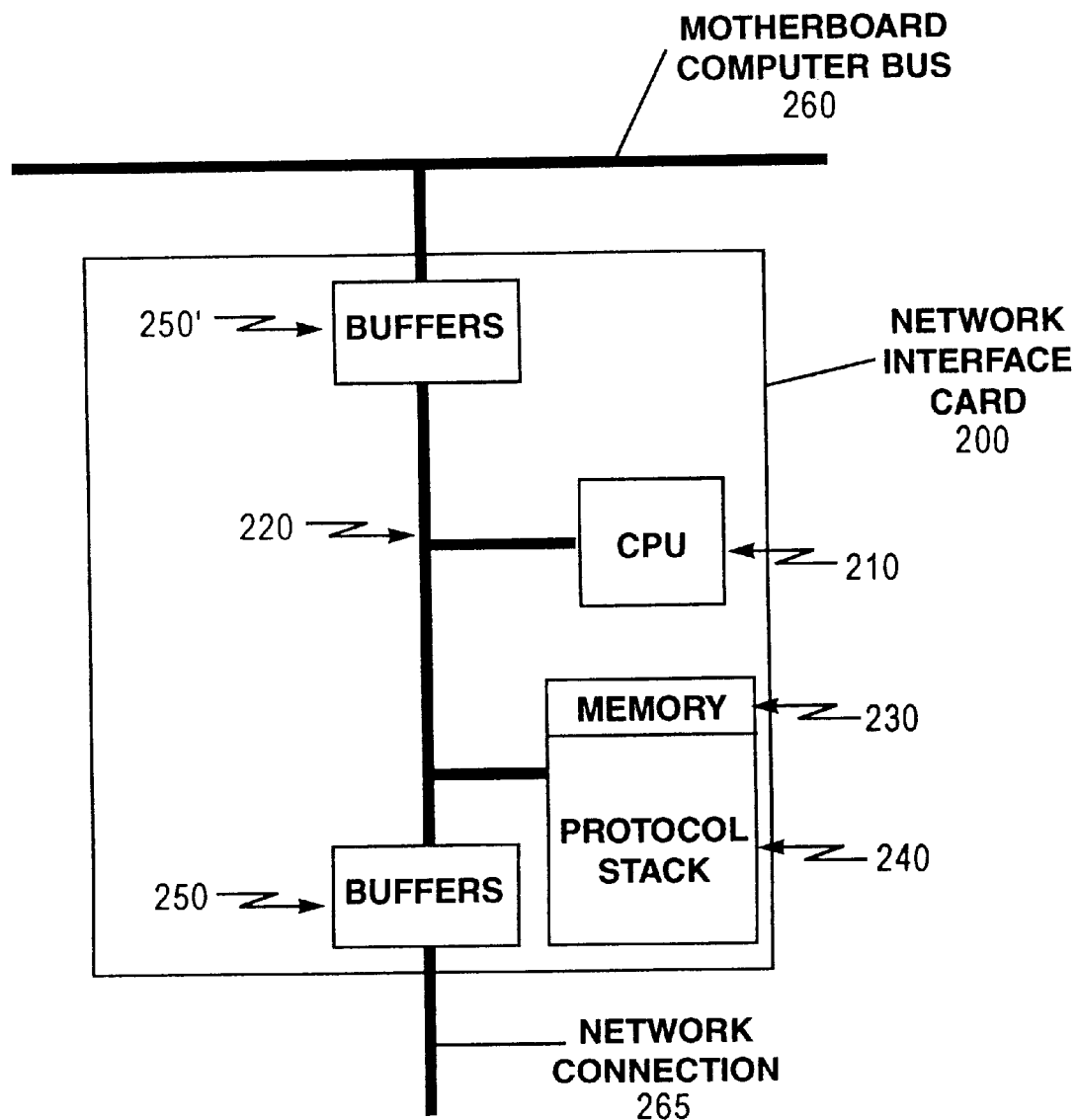
FIG. 2 is a block diagram of a network module such as a network interface card suitable for implementing a look-ahead cache process as part of a network protocol stack in accordance with the invention.

FIG. 2 is a block diagram of a network module, such as a network interface card, suitable for implementing a look-ahead cache process as part of a network protocol stack. The function of a network card 200 is to mediate between the computer and network. Typically, network interface card 200 plugs into a connector on the mother board computer bus 260. Some type of media, for example a cable, for the network generally connects to the network interface card as illustrated at 265. Although network interface cards vary in their construction and design, a typical implementation is shown in FIG. 2. A central processing unit 210 is connected to a bus 220. Memory for operation of the network interface card is also connected to the bus. The memory 230, may include a protocol stack 240 for managing the sending/receiving of data in accordance with the network protocol. As pointed out before, it is possible to implement the LCP as part of a network protocol stack 240. Buffers 250 and 250' interface the network card with the network connection and with the mother board computer bus, respectively.

Figure 3:
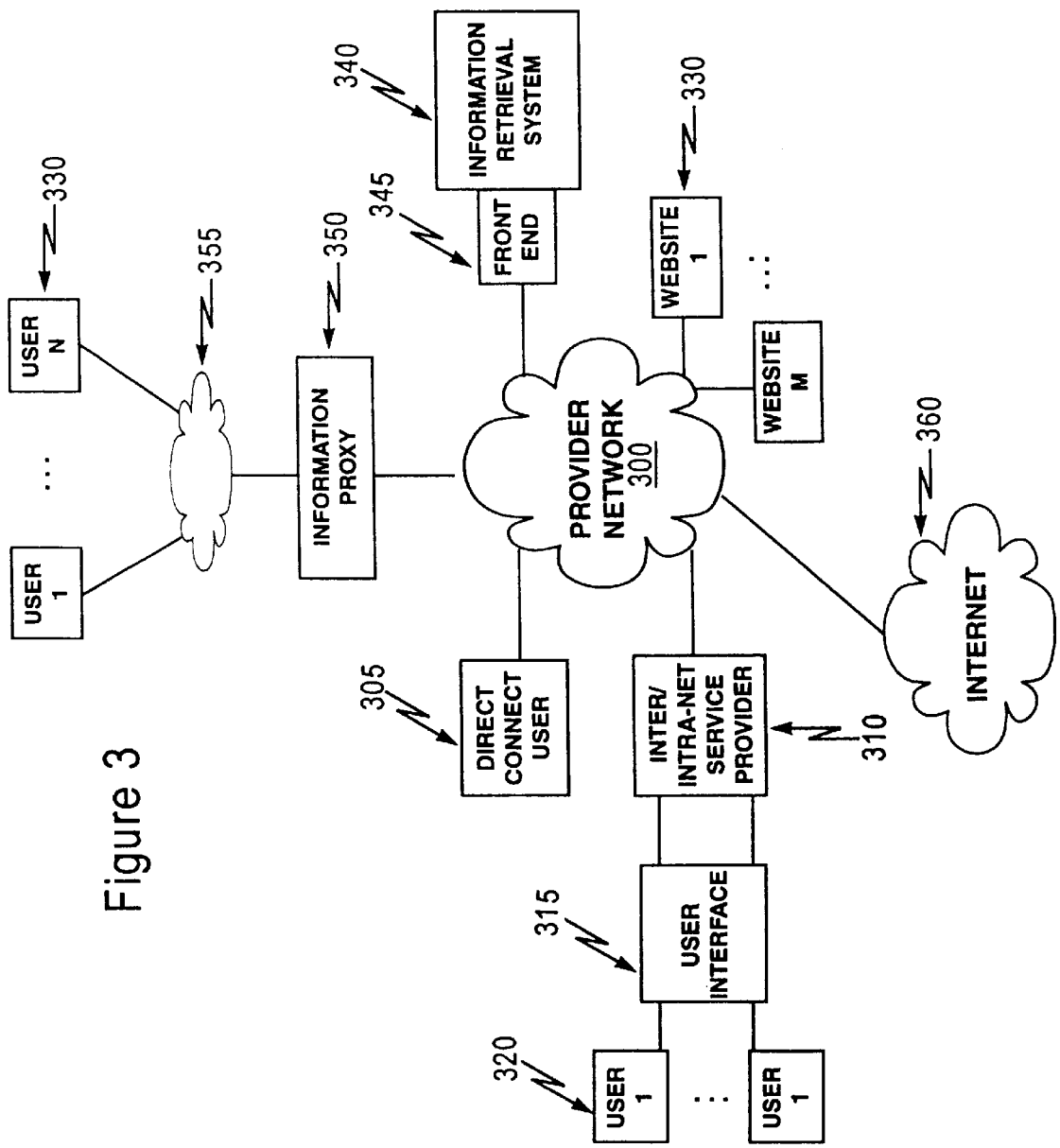
FIG. 3 is a block diagram of a network system with components suitable for carrying out the invention.

FIG. 3 is block diagram of a network system having components suitable for carrying out the invention. FIG. 3 illustrates a provider network 300 in a variety of applications and users connected thereto. A connection to the wider Internet is shown by 360. A direct connect user 305 connects directly to the network without the intervention of other services. Inter/intranet service providers 310 provide network access to a number of users 320 over a user interface 315. Internet service providers typically provide each user with a particular network address which allows the user to access network information in the same way as a direct connect user. Users 320 will connect to the internet service provider 310 using either dedicated or dial up network connections as the user interface 315.

A variety of information server processes run on computers connected to the network. These are typically implemented as web sites 330. A number of information retrieval systems 340 may be connected to network 300. The information retrieval front end 345 provides a standardized syntax and interface for receiving user requests for information and returning the information to the user.

Information proxy 350 interfaces a plurality of users 360 via a network interface 355. Network interface 355 can be, for example, a dial up network.

Figure 4:
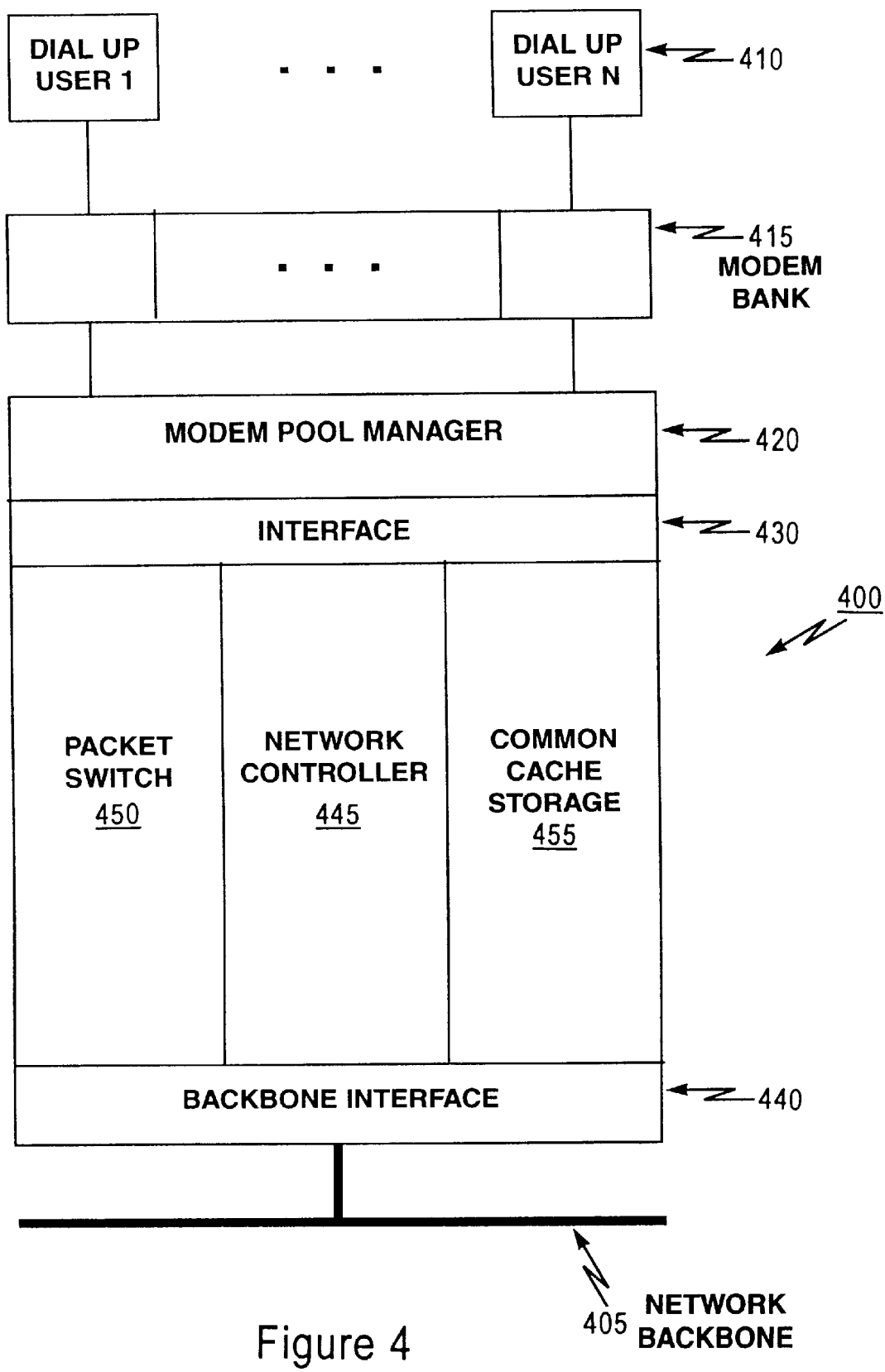
FIG. 4 is a block diagram of an information proxy suitable for carrying out the invention.

FIG. 4 is a block diagram of an information proxy suitable for carrying out the invention. The information proxy 400 connects to a network backbone via interface 440. A plurality of, for example, dial-up users 410 connect to individuals modems of a modem bank 415. A modem pool manager 420 manages the communication sessions of dial-up users. A network controller 445 controls the packet switch 450 for directing information from a particular user to the backbone interface in an orderly fashion. When implementing the LCP as part of an information proxy, a common cache storage 455 is utilized to hold information retrieved for a set of users connected to a proxy over the common access media, e.g., modem bank.

Incorporation of an LCP into information proxies is desirable since a single proxy can provide LCP benefits to all viewers that use of proxy without having to incorporate the LCP into each viewer. This is especially true for web proxies. There is also the added possible benefit that all users can share the same cache.

Figure 5:
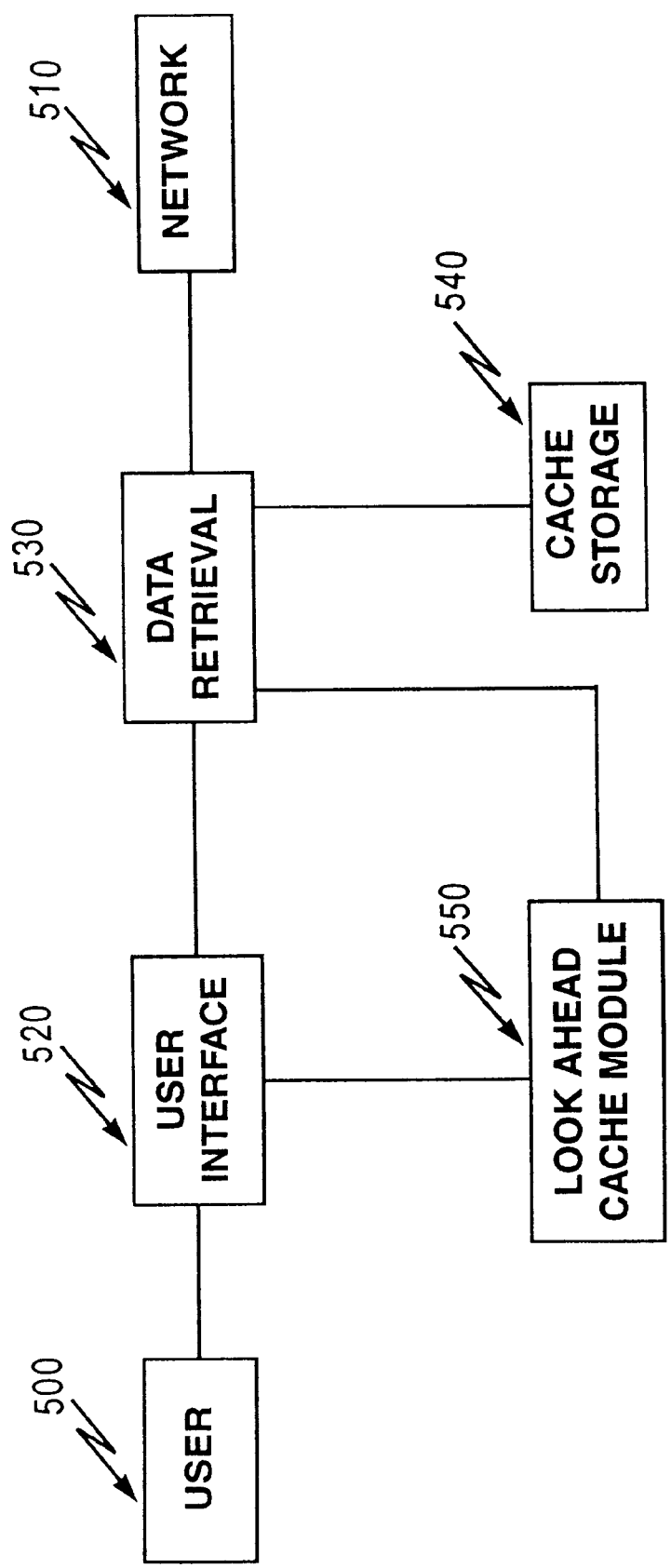
FIG. 5 is a block diagram of a reference model of a look-ahead cache process which can be implemented in a variety of hardware and software environments.

FIG. 5 is a block diagram of an implementation reference model of a look-ahead cache process. The key LCP relevant modules are the user interface 520, the data retrieval module 530, the look-ahead cache module 550, and the cache storage module 540.

The user interface module supports all user information requests, formats information for display, and handles display of information to the user. To support LCP, the user interface module preferably supports look-ahead related configuration parameters and controls.

The data retrieval module handles all requests for loading information (data) from the user interface. To support LCP, the data retrieval module will need to coordinate user requests and preloading of information. In this reference model, all loading of information is performed by this module.

The cache storage module coordinates the local copies of information that are maintained for possible rapid recall by the user. To support LCP, the cache storage module needs to handle and dispose of information that has not actually been requested by the user.

The look-ahead cache module provides control needed to preload information in preparation for possible retrieval by the user.

Figure 6A:
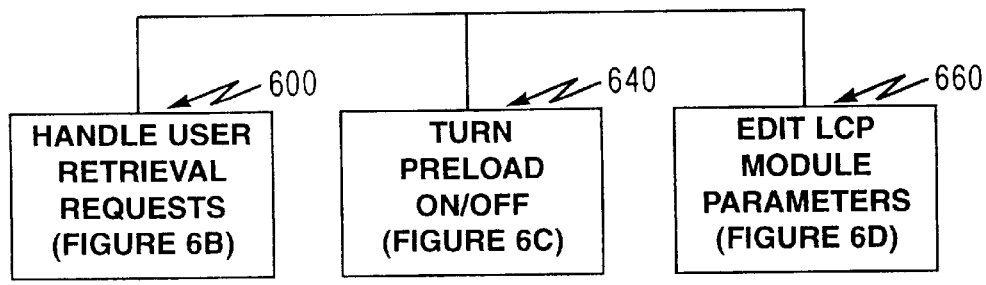
FIG. 6A is a block diagram of the user interface module of the reference model of FIG. 5.

FIG. 6A is a block diagram of a user interface module of the reference model of FIG. 5. The user interface module has three principal areas of functionality. It handles user retrieval requests (600) as shown more in detail in FIG. 6B. It enables and disables preload (640) as shown more particularly in FIG. 6C. It permits the editing of LCP module parameters (660) as discussed more in conjunction with FIG. 6D.

Figure 6B:
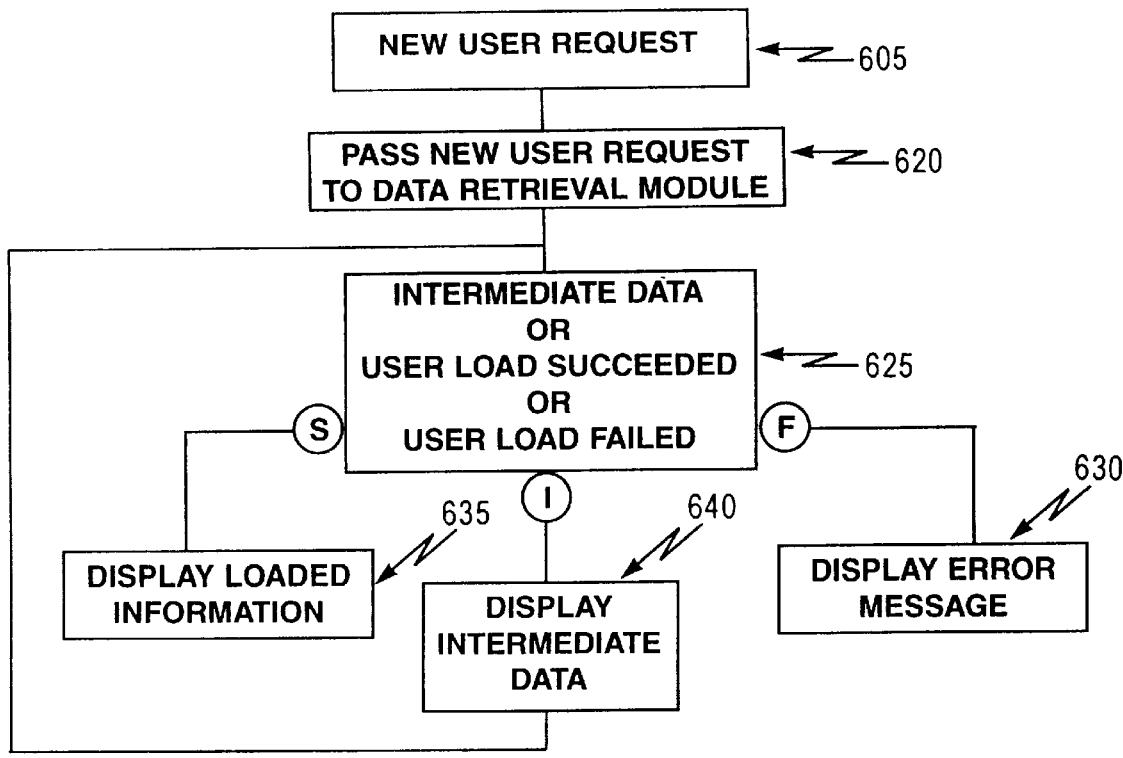
FIG. 6B is a flow chart of a process for handling user retrieval requests, shown in FIG. 6A, in accordance with the invention.

FIG. 6B is a flow chart of a process for handling user retrieval requests, as shown in FIG. 6A in accordance with the invention. When a new user request is asserted (605) the new user request will passed to the data retrieval module (620) for retrieval. If any intermediate data is delivered for display, then the information is displayed (690) and a further response from the data retrieval module will be expected (625). If the final result of that retrieval is a UserLoadSucceeded or UserLoadFailed, then the loaded information will be displayed (635) or an error message will be displayed (630) respectively.

Figure 6C:
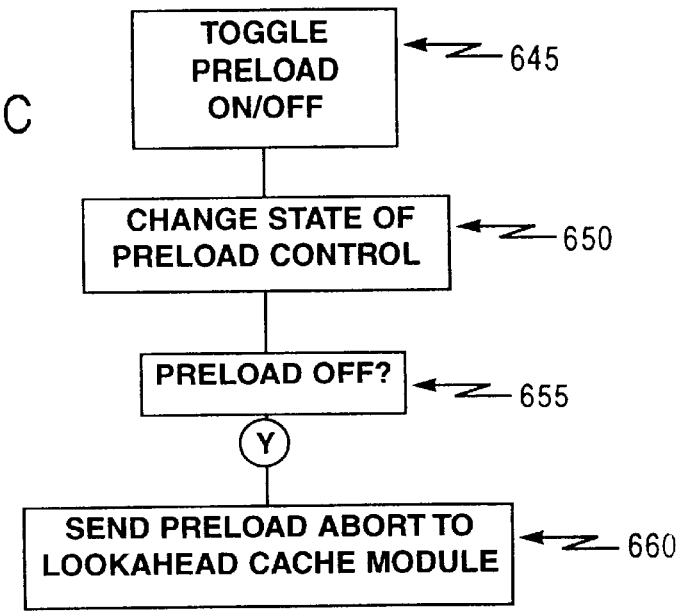
FIG. 6C is a flow chart of a process for turning preload on and off as shown in FIG. 6A in accordance with the invention.

FIG. 6C is a flow chart of a process for enabling and disabling preloading, as shown in FIG. 6A, in accordance with the invention. The user interface provides a toggle function (645) to permit preloading to be switched on and off depending upon a user's preferences or needs. When the toggle is activated, the state of the preload control is changed (650) to be different from what it was prior to activation of the toggle. If the new state is off (655-Y) a PreloadAbort is sent to the look-ahead cache module (660).

Figure 6D:
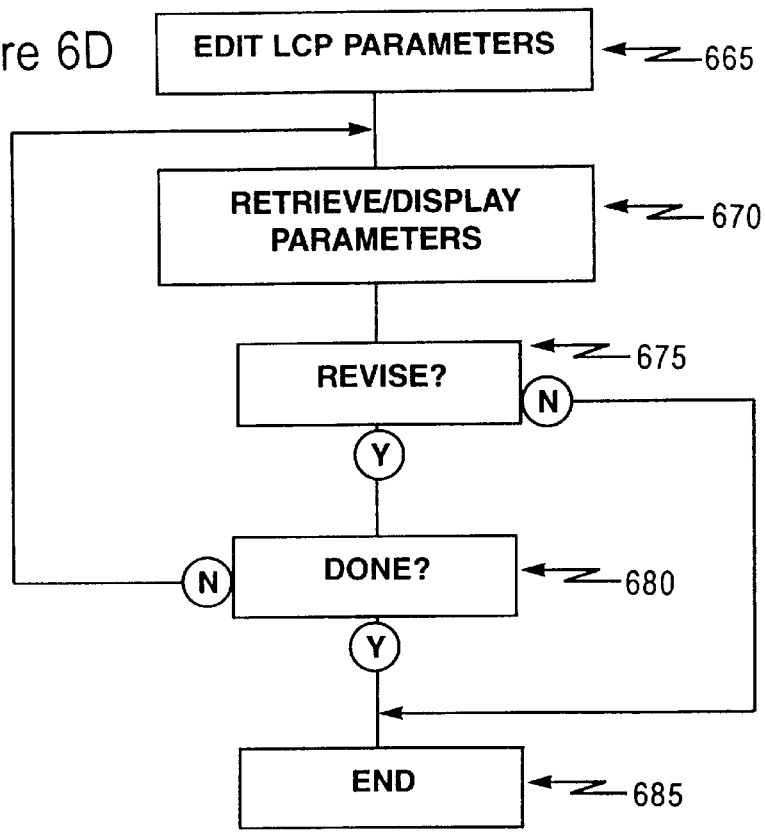
FIG. 6D is a flow chart of a process for editing LCP module parameters, shown in FIG. 6A, in accordance with the invention.

FIG. 6D is a flow chart of a process for editing LCP module parameters as shown in FIG. 6A in accordance with the invention. If a user desires to edit LCP parameters (665) those parameters will be retrieved and displayed (670). If a user desires to revise the parameters, a user may do so (675) and make changes until the user indicates that the changes are done (680-N). If not done, the user may continue to modify retrieve display parameters (680) and revise them. Once the user indicates that the changes are completed (680-Y; 675-N), the process ends.

Figure 7:
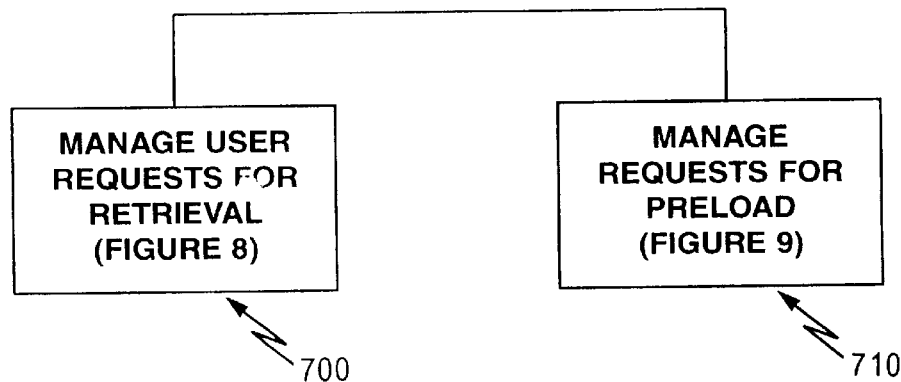
FIG. 7 is a flow chart of a data retrieval module of the reference model of FIG. 5.

FIG. 7 is a flow chart of a data retrieval module of the reference model of FIG. 5. The data retrieval module handles two principal kinds of requests. It manages user requests (700) and it manages requests for preload from the look-ahead cache module (710).

Figure 8:
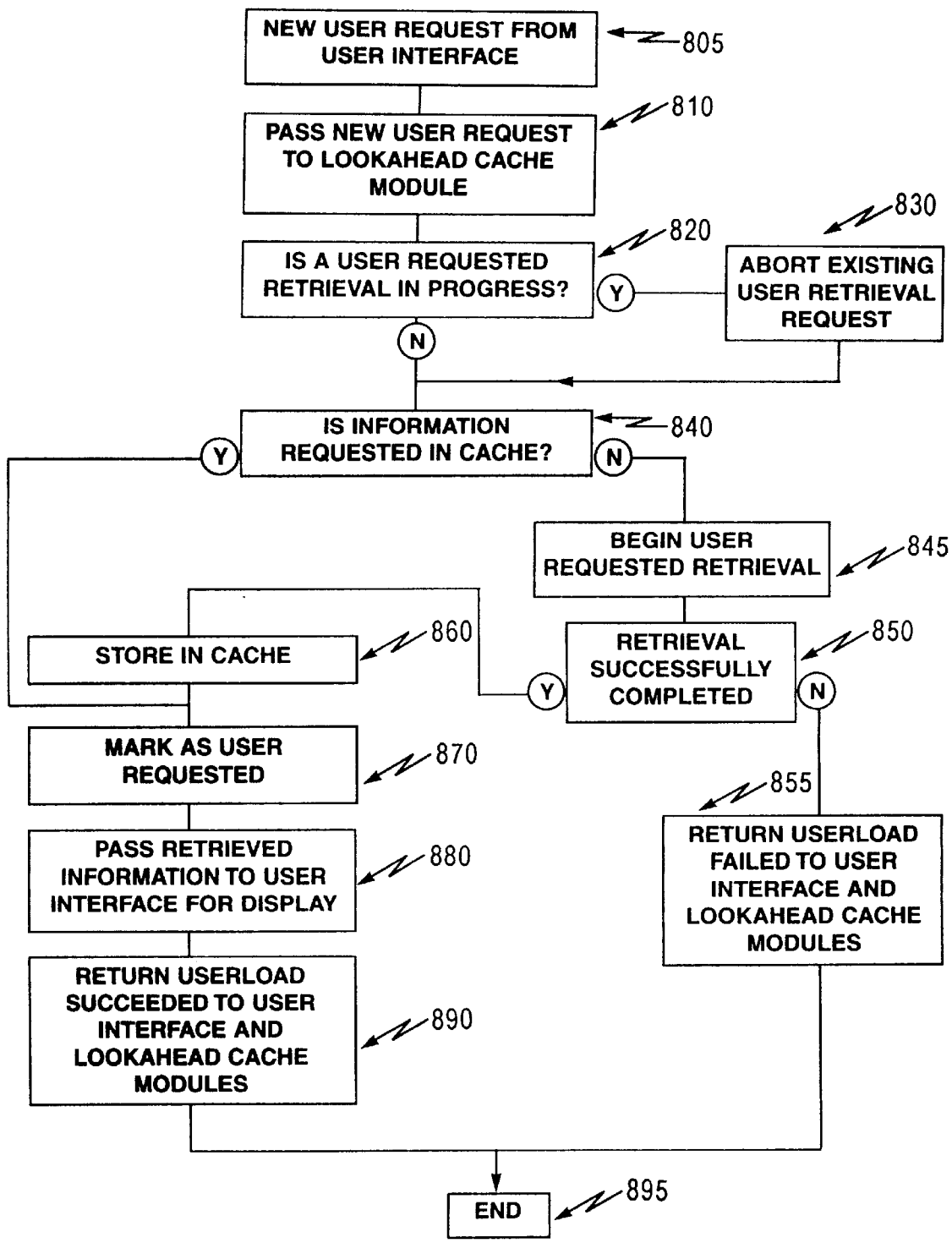
FIG. 8 is a flow chart of a process for managing user information (data) retrieval requests for retrieval, shown in FIG. 7, in accordance with the invention.

FIG. 8 is a flow chart of the portion of the data retrieval module that manages user requests for retrieval, as shown in FIG. 7, in accordance with the invention. When a new user request is received from the user interface (805), NewUserRequest is passed to the look-ahead cache module (810). A check is then made to determine if a user requested retrieval is in progress (820). If one is (820-Y), the existing user retrieval request will be aborted (830). If no, (820-N) and after a possible abort (830, a check is made to determine whether or not the information requested exists in the cache (840). If it does, then the information is marked as user requested (870) and passed to the user interface and look-ahead cache modules (880, 890). Otherwise, the new user requested retrieval (845) can begin. If the retrieval is not successfully completed (850-N), a UserLoadFailed event occurs which will be returned to the user interface and the look-ahead cache modules (as described). If the retrieval successfully completes (850-Y), the retrieved information will be stored in the cache (860), marked as "user requested" (870), passed to the user interface for display (880), and the module will return UserLoadSucceeded to the user interface and look-ahead cache modules (890).

It may be desirable to store partial retrievals received over the network (such as those occurring during block transfers) in the cache for later use. Such a use might be for rapid display of partial information to a user followed by the resumption of the download of material previously interrupted.

Figure 9:
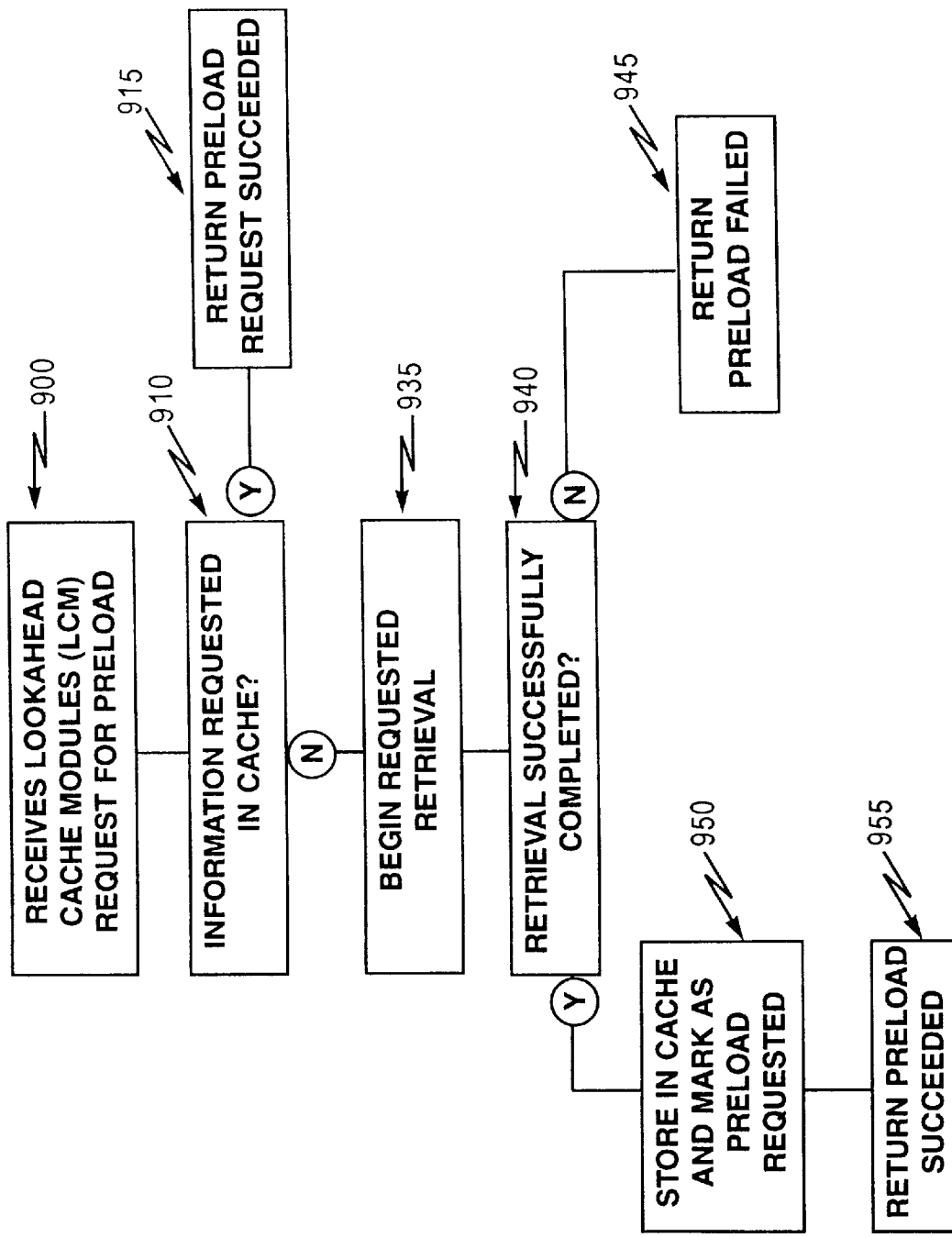
FIG. 9 is a flow chart of a process for managing preload requests from a look-ahead caching module in accordance with the invention.

FIG. 9 is a flow chart of the portion of the data retrieval module that manages preload requests from the look-ahead cache module in accordance with the invention. When an LCM request for a preload is received (900), a check is made to determine whether or not the information is resident in cache (910). If it is, the PreloadRequestSucceeded state is returned (915). Otherwise, the requested retrieval will begin (935). If it successfully completes the retrieval, the retrieved data is stored in cache and marked as preload requested (955) and the PreloadSucceeded event occurs (950). Otherwise, the event preload failed (945) occurs.

Figure 10:
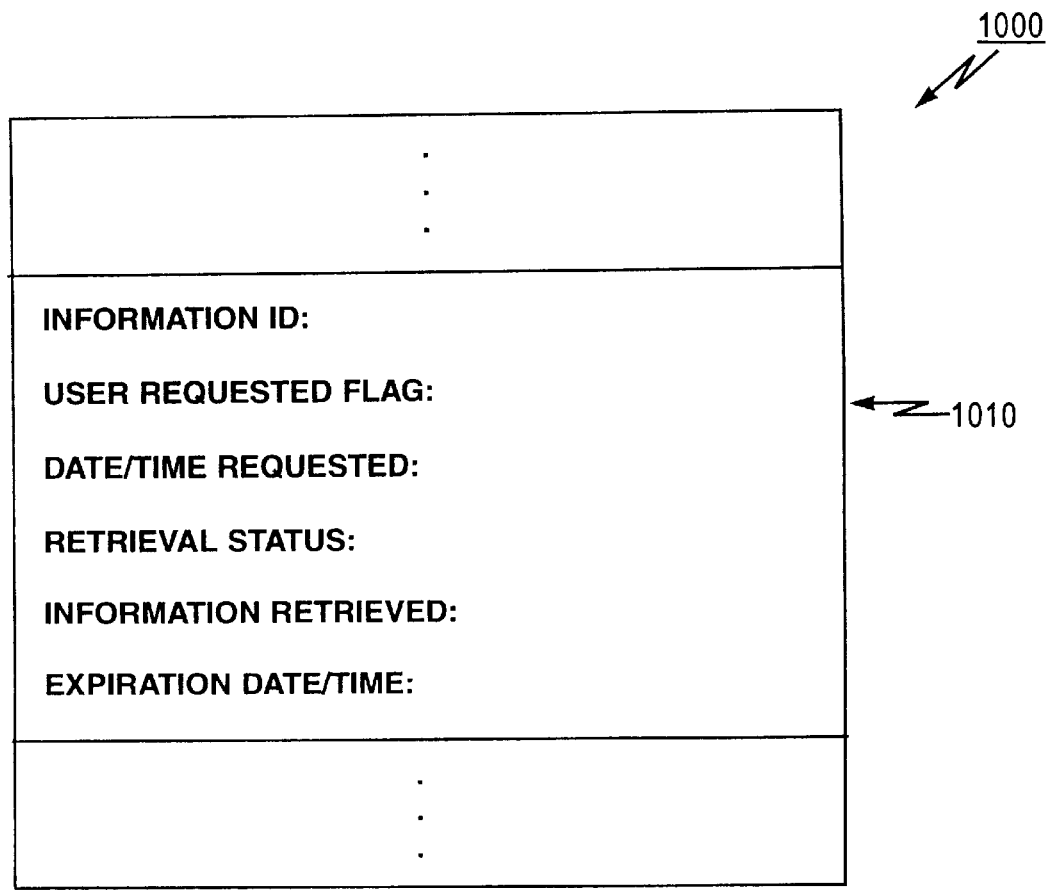
FIG. 10 is a diagram illustrating an exemplary record layout for cache storage information from a retrieval.

FIG. 10 is a diagram illustrating an exemplary record layout for storage of information from a retrieval in a cache. Typically, cache storage is located temporarily in memory and more permanently on a hard drive or other mass storage device. Each information item retrieved is stored together with certain information as shown in item 1010 of cache 1000. A plurality of information items relating a particular information retrieval are stored with the information retrieved to facilitate management and control of the cache and the retrieval and display of information. The information ID is essentially the location of the information on the network. A flag is utilized to specify whether the data is user requested and to distinguish it from preload data. The data/time retrieved and the retrieval status are also stored. The retrieval status will either be succeeded, partial or failed. The partial status will be utilized only when partial documents are stored because of, for example, the occurrence of an interrupt in the retrieval process of a document.

Figure 11A:
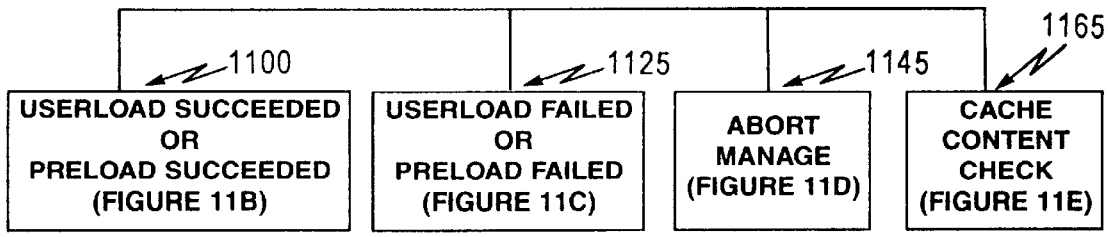
FIG. 11A is a block diagram of a cache storage module of the reference model of FIG. 5.

FIG. 11A is a block diagram of a cache storage module of the reference model of FIG. 5. Four different groupings of functionality are handled by the cache storage module. These groupings include the handling of a successful retrieval (1100), the handling of an unsuccessful retrieval (1125), the management of aborting a retrieval (1145) and the checking of cache contents to determine whether a particular retrieval requested is stored in cache (1165).

Figure 11B:
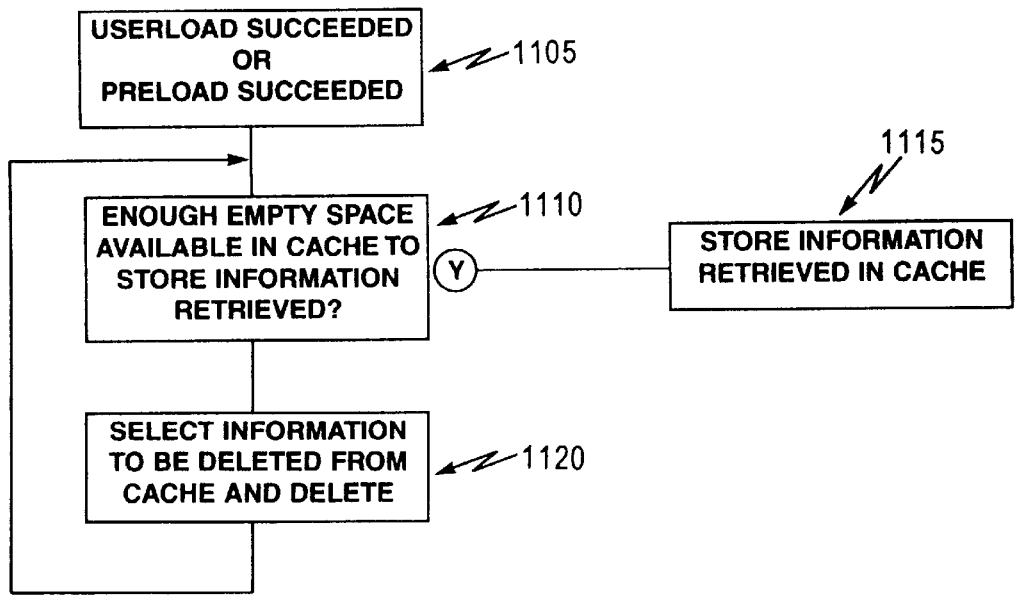
FIG. 11B is a flow chart of an exemplary process for handling a successful retrieval of information in accordance with the invention.

FIG. 11B is a flow chart of an exemplary process for handling a successful retrieval of information in accordance with the invention. Upon a UserLoadSucceeded or upon a PreLoadSucceeded event (1105) a check will be made to see if there is enough empty space available in cache to store the information retrieved. If there is, the information retrieved will be stored in the cache (1115). Otherwise, the cache module will need to select information to be deleted from the cache and then actually delete that information to make room for the newly succeeded retrieval (1120). Depending on implementation, there may be two levels of cache storage, a smaller store in memory and a larger store located on a hard drive. It is generally necessary to perform the described process for both memory and disk caches, as well as retrieve information from the hard drive and place in local memory to facilitate the display of that information to the user.

The section of which information to delete from the cache to make room for recently retrieved information can be done in a number of ways. In one approach, the oldest information, based on the date time stamp, is deleted. Another approach would be to delete the information to which no access has been made subsequent to its retrieval, or which has reached a maximum cache time. In yet another embodiment, a combination of these two techniques might be utilized. Further, it is possible to have different treatments when selecting information to be deleted, based on whether or not the information is user requested or preload requested.

Figure 11C:
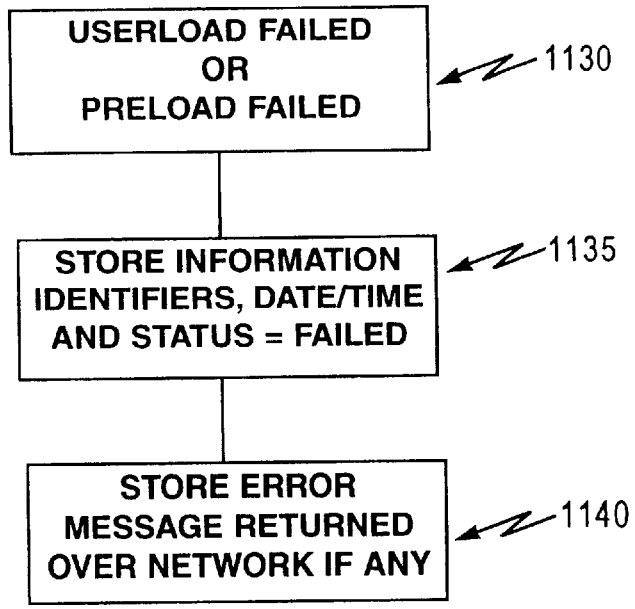
FIG. 11C is a flow chart of an exemplary process for handling failure of a retrieval in accordance with the invention.

FIG. 11C is a flow chart of an exemplary process for handling failure of a retrieval in accordance with the invention. If a retrieval fails (1130) it may be desirable to store the information identification of the information requested, the date and time of the failure, and to record the status as equal to "failed" (1135). If an error message is returned over the network, that could be stored as if it were retrieved information (1140). Thus, when a preload fails, and a user subsequently requests the information which would have been preloaded but for the failure, in some cases the user can be presented with the error message received over the network as if the retrieval had been a user requested retrieval.

Figure 11D:
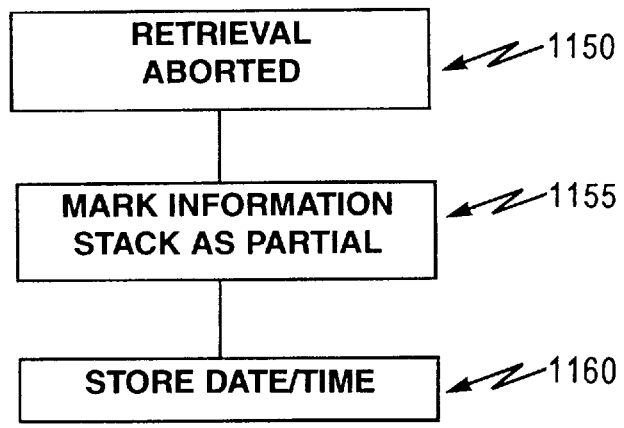
FIG. 11D is a flow chart of an exemplary process for handling the case where a retrieval is aborted.

FIG. 11D is a flow chart of a module for handling the case where a retrieval has begun and it becomes necessary to abort that retrieval (1150). If partial storage is implemented, the information can be stored and marked as partial in the cache (1155). The date and time of the termination of the retrieval is also stored (1160). If partial storage is not implemented, the data retrieved up to the point where the process is aborted would simply be discarded.

Figure 11E:
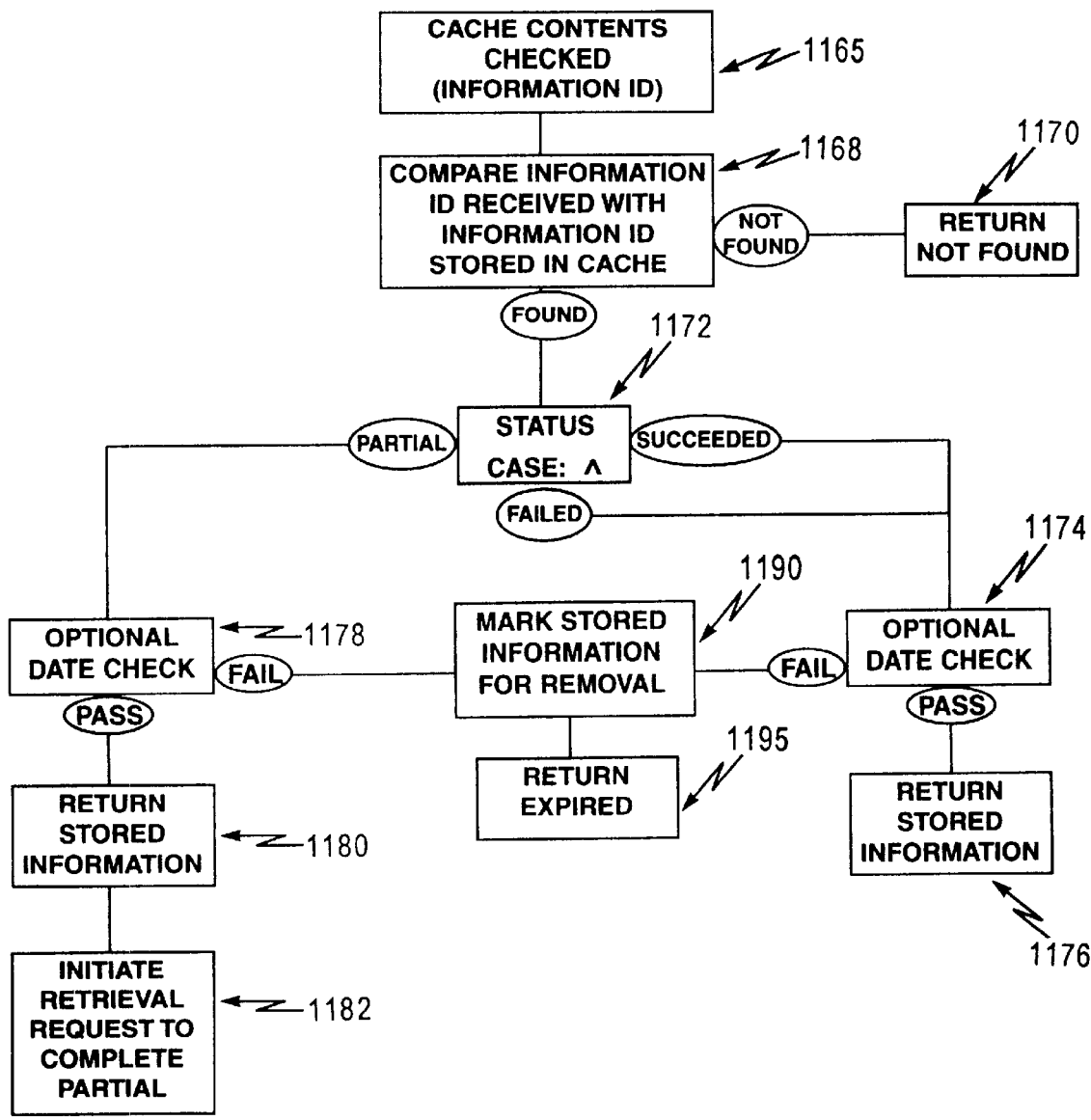
FIG. 11E is a flow chart of an exemplary process for checking whether the contents of the cache includes requested information in accordance with the invention.

FIG. 11E is a flow chart of an exemplary process for checking whether the contents of the cache includes requested information in accordance with the invention. When a user request is received, the cache contents are checked by passing the information ID to the cache contents check process (1165). The information ID received with the check request is compared with information ID stored in the cache (1168). If the ID is not found, that fact will be returned (1170) and the information ID of the information desired will be utilized to retrieve the information over the network. If the information ID is found within the cache, a check will be made of the status of the information (1172). If the retrieval had succeeded, a date check may be made (1174) to ensure that it is not too stale, but otherwise, the stored information will be returned and made available to the user interface for display to the user (1176). If the status of the stored information has failed (1172-Failed), a check of the date and time of the failure will be made (1174) to see if it was long enough ago that another retrieval attempt should be made. Otherwise, the error message information stored is returned for display to the user (1176). Whenever the optional date check (1174) fails, the stored information is marked for removal (1190) and not found will be returned.

If the stored information is only partial (1172-Partial), a check of the date time stamp under which the partial information was stored is made (1178) to see if the information is fresh enough to be usable. If it is, the stored information will be returned (1180) for display to the user and a retrieval of the balance of the information is initiated (1182) SO that the entire information will be available to the user. Otherwise the stored information is marked for removal (1190) and not found will be returned.

Figure 12A:
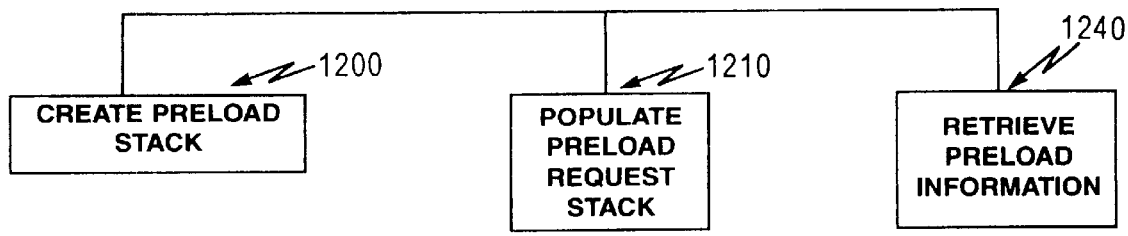
FIG. 12A is a block diagram of an exemplary look-ahead cache module (LCM) of the reference model of FIG. 5 in accordance with the invention.

FIG. 12A is a block diagram of an exemplary look-ahead cache module (LCM) for the reference model in FIG. 5 in accordance with the invention. The LCM creates a preload stack or similar data structure with a number of storage locations usually based on the PreloadLinks variable which has set upon initialization of the LCP (1200). Once the preload stack is created, it is populated to carry out the preloading of information in a particular order (1210). Once the preload stack is populated, it will be utilized to retrieve preload information (1240).

Figure 12B:
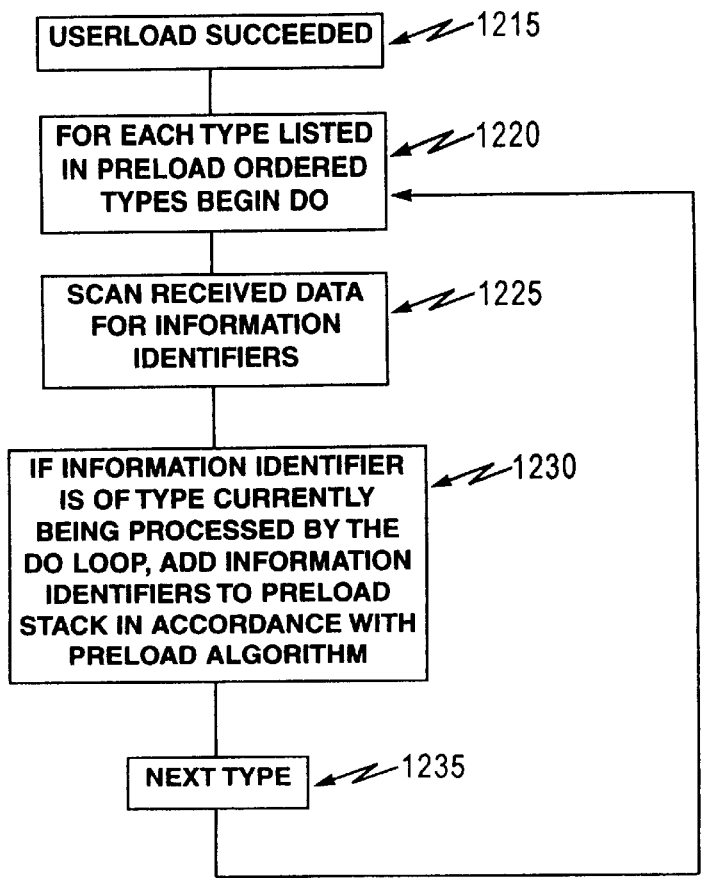
FIG. 12B is a flow chart of a process for carrying out populating of a preload request stack in accordance with the invention.

FIG. 12B is a flow chart of a process for carrying out populating of a preload request stack in accordance with the invention. When a user load request succeeds (1215) for each type listed in the PreloadorderedTypes variable (1220) a do-loop is begun. For each of the types, a scan is made of the received data for locating information identifiers (1225). If an information identifier is of the type currently being considered in the do-loop, an information identifier will be added to the preload stack in accordance with the preload algorithm (1230) as discussed more hereinafter. Then the next type (1235) listed in the PreloadorderedTypes list will be considered. Note that the type that will be preloaded first is the type listed last in PreloadOrderedTypes.

The LCP requests certain parameters during operation and it is desirable to have these parameters accessible for user configuration. These parameters may need to be adjusted to optimize performance based on the specifics of the information, the network, the computer environments and to some extent operational experience. These parameters may even be changed dynamically based on observed user behavior. The list is intended to be a sample, and it is not an exhausted.

The following parameters are likely to be the most useful. A variable known as PreloadLinks reflects a maximum number of information data-links to preload based on a single user request. A data link is commonly in the format known as the uniform resource locator or URL, for the World Wide Web. It corresponds to an information identifier as used elsewhere.

A variable PreloadTime reflects the amount of time during which information should be preloaded. It represents an upper bound and the interval should be measured from the completion of the last user retrieval request. This is used to limit the total elapsed time that may be spent preloading information based on a single user request.

A variable PreloadAmount reflects a maximum amount of data that should be preloaded based on a single user request. A variable PreloadProtocols includes a list of protocols that should be used during preload. In the case of the World Wide Web, this list would normally include at least HTTP and possibly other protocols such as FTP.

The variable PreloadOrderedTypes is a list used to control the order in which information types are preloaded. Basically, it controls whether information of each type is loaded when encountered or only after each of the preceding types is loaded. Some examples of web related types are HTML, image (JPEG or GIF), text, application specific (e.g. ZIP, PS or EXE). In the case of the World Wide Web, at least HTML, text and images are recommended. One implementation option allows for the case that the user may not be viewing images. In this case images would only be preloaded once the user actually requested the retrieval of an image.

The PreloadRatio variable is used to indicate the ratio between depth first and breadth first loading of information.

Certain file extension types may also be excluded from preloading. The types will depend on information format being used, will most likely change over time and specific use or as new file types are developed. A list of sample files types, based of file extensions and developed for use with the World Wide Web follows. This is not an absolute list.

| | | |
|---|---|---|
| | EXE | PC executable |
| | GZ | GZIP |
| | HQX | BINHEX |
| | MAP | html map |
| | PDF | Adobe portable document format |
| | SCA | Mac self extracting archive |
| | SIT | stuffit |
| | TA | UNIX tar utility |
| | TAZ | tar + GZIP |
| | TGZ | tar + GZIP - another form |
| | Z | UNIX compress |
| | ZIP | PC zip utility |
| | AU | audio |
| | AVI | audio/video |
| | MOV | movie |
| | MPEG | MPEG video |
| | RAM | audio file |
| | WAV | windows audio |

The retrieval of information can be based on passing of the retrieved document identifiers. Some information (data) links may be loaded with higher priority than others. For example, with HTML, frames, redirect and the next links may be preloaded at a higher priority than other information link types.

In most uses, it is expected that images will be preloaded in an order that matches expected order of user requests. Which is images on a document are viewed prior to following any text information links. Beyond the previously mentioned automatic detection of when images should be preloaded, it is also possible to preload images in an order other than what would match expected normal user behavior. In one implementation, identified images were always preloaded at a higher priority than text. This is the reverse of normal retrieval practice. This approach can be suitable for users who place a higher value on image load times.

Also, ordering of links to be preloaded may be dependent upon observed user behavior. For example, experience has shown that users tend not to select the first few links on a page. Thus, it may be advantageous to reorder the links to have the middle links selected before the first and last links. The ordering pattern may be dynamically updated based on observed user behavior.

Figure 12C:
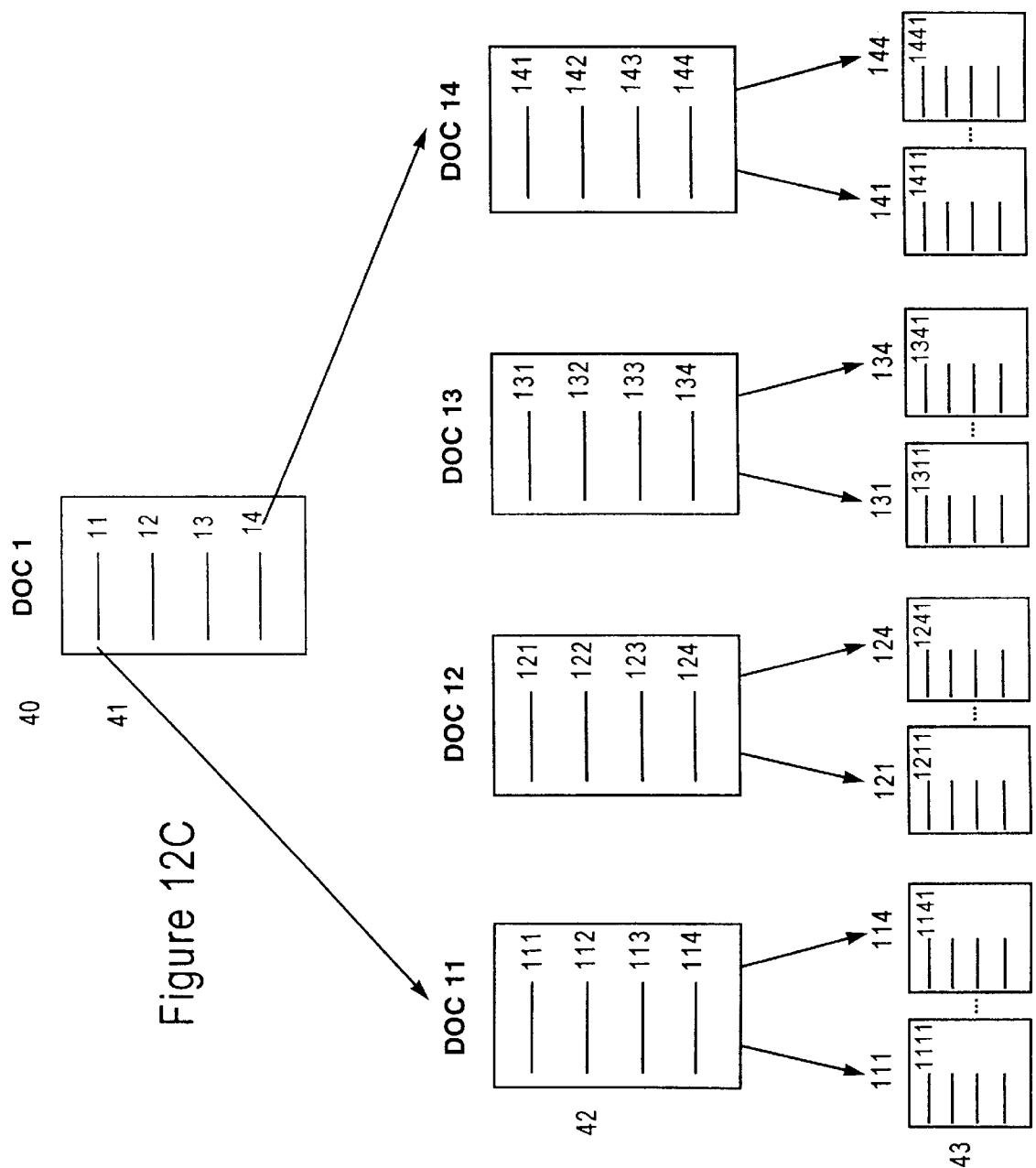
FIG. 12C is a representation of a hierarchy of information linkages used to explain the operation of the invention.

FIG. 12C is a representation of a hierarchy of information linkages used to explain the operation of the invention. FIG. 12C is based on a hypothetical information hierarchy. A user requested document 1 contains 4 information identifiers, namely, 11, 12, 13, and 14. Each of those identifiers identifies a document, namely, document 11, document 12, document 13, and document 14. Each of those documents has four additional information identifiers, which in turn point to four additional documents which will themselves have four additional identifiers.

As can be seen, the hypothetical case creates a hierarchy of information linkages between the information identifiers of the various documents. These can be represented as a tree in which a zero level address is document 1 which forms the root and the four document identifiers 11, 12, 13 and 14 represent the first set of branches. Each of those document identifiers then branches into four document identifiers and then each of those branches into yet another set of four.

The particular ordering of document identifiers provided for the preload stack determines the characteristics of the preload. The stack may be loaded in a depth first fashion. Thus, the documents would be preloaded in an order as follows:

1, 11, 111, 1111, 1112, 1113, 1114, 112, 1121, 1122, 1123, 1124, 113 . . . .

Alternatively, the stack may be loaded in a breadth first fashion in which whole levels of information are preloaded before proceeding to the next level. Such a strategy might be pursued as follows:

1, 11, 12, 13, 14, 111, 112, 113, 114, 121, 122, 123, 1247 131 . . . .

It is possible to load the preload stack in a hybrid manner as well, which is a combination depth first and breadth first arrangement. Essentially, this variation follows a breadth search pattern except that for each information identifier, the links of that identifier are pursued a certain number of identifiers deep before continuing on to the next element of the breadth search. The number of links deep for each element of breadth is reflected in the PreloadRatio previously discussed.

The following is a procedure that can be utilized to implement breadth first preloading. When the LCM is passed user requested information, data links contained in that information are added to the head of the data list with the first new data link at the head of the data list and the other data links in the user requested information added thereafter. When preloaded information is received, the data links contained therein are added to the stack at the point saved on the previous addition to the stack while leaving the first new data link from the preloaded information toward the head of the stack. For each data link being added, it is only added to the stack if the data link protocol type is listed in the PreloadProtocols configuration parameter, and that link is not already listed earlier in the preload stack. If the list is larger than the maximum stack size, excess links are removed from the tail of the stack. Then the point of entry of the last new data link is marked as a point for the next insertion.

A similar procedure can be used to implement depth first loading. When passed information (user requested or preloaded) data links contained in the information are added to the head of the data list, maintaining data link listing order by leaving the first new data link at the head of the list. For each data link being added, it is added to the stack only if the data link protocol type is listed in the PreloadProtocols configuration parameter. If the list is larger than the maximum stack size, data links are removed from the tail of the list.

For hybrid loading, when passed user requested information, data links are added to the head of the stack maintaining the data link listing order by leaving the first new data link at the head of the data list. A counter of preload depth is set to 0. When passed preloaded information, if the preload depth is less than the PreloadRatio configuration parameter, data links contained in the information or added to the head of the data list maintaining the data link listing order by leaving the first data link at the head of the data list. Otherwise, data links are added to the stack at the point saved in the previous addition to the data list while maintaining the data link listing order by leaving the first data link toward the head of the data list. The tail of the new data links is marked as point for the next insertion. For each data link being added, it is only added to the stack if the data link protocol type is listed in PreloadProtocols configuration parameter. If the list is larger than maximum stack size, data links can be removed from the tail of the data list.

Figure 12D:
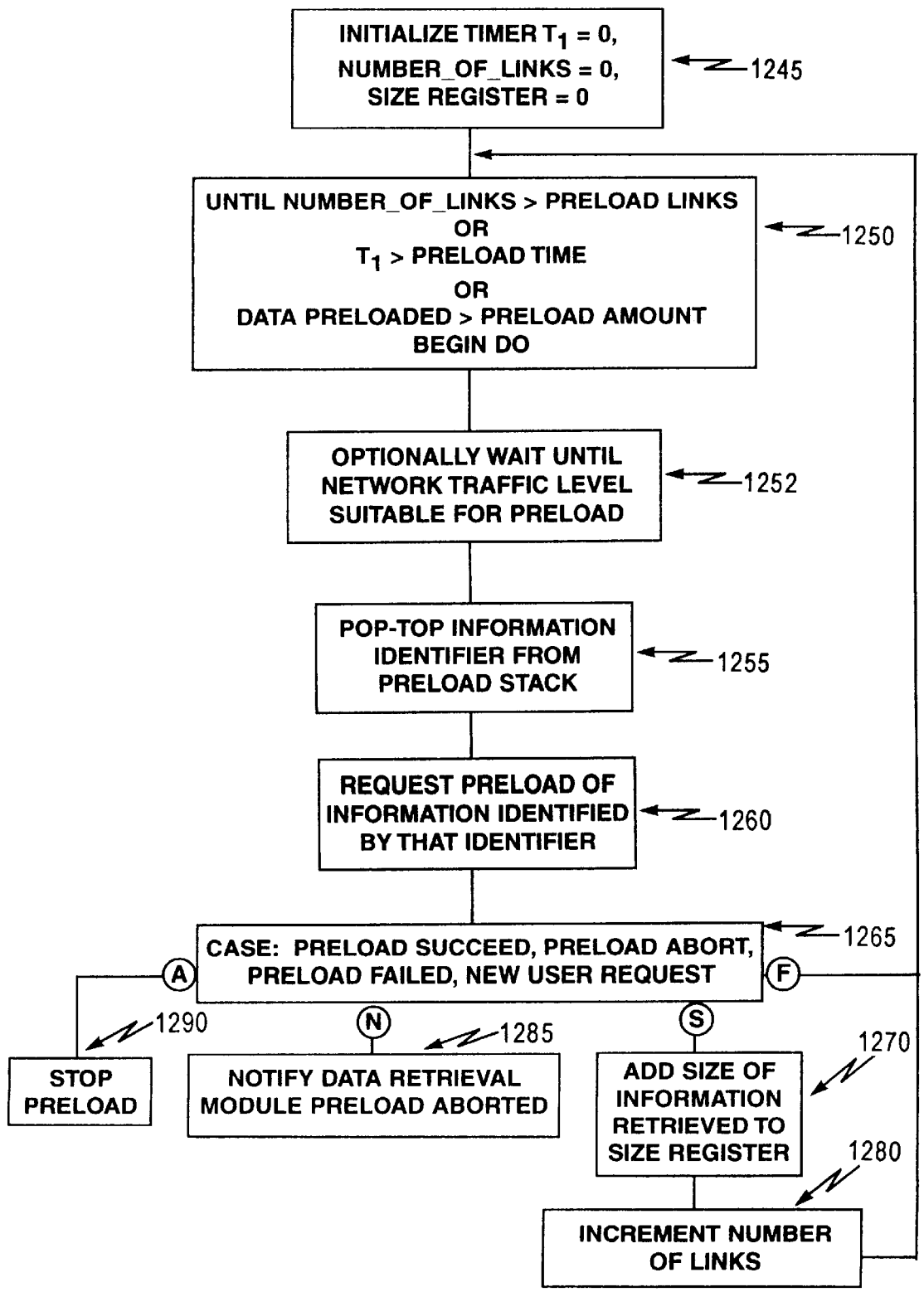
FIG. 12D is a flow chart of an exemplary preload retrieval process used in accordance with the invention.

FIG. 12D is a flow chart of an exemplary preload retrieval process used in accordance with the invention. After a user requested retrieval succeeds, a timer T1 is set to 0, a number of links variable is set to 0 and a size register is set to 0 (1245). As long as the timer, the number of links variable and the size register are less than their maximum values, a loop is begun including the following. Before requesting a preload, an optional check is made to determine if the network load is such that a preload is permitted (1252). When it is, the top information identifier is popped off the preload stack (1255) and a request is made to preload the information identified by that identifier (1260). That preload retrieval will either succeed, fail, be aborted or be preempted by a NewUserRequest. If it succeeds, the size of the information retrieved is added to the size register (1270). Then, the number of links variable is incremented (1280) and the return is to the beginning of the loop. If it fails, the return is to the beginning of the loop. If it is aborted, the preload process stops (1290). If it is preempted by a NewUserRequest, the data retrieval module is notified to cancel the preload (1285) and the preload process stops.

By setting up the look-ahead cache process in the manner described, look-ahead caching can be implemented in a number of software environments to run on almost any type of hardware platform. The appearance to the user by judiciously selecting which items to preload is that system response time has been improved. In fact, the review time utilized by the user of information items already retrieved is productively employed to retrieve other documents which the user is likely to request so that they are available when the user makes the actual request. In this way, the problems of the prior art are overcome in a new and useful look-ahead caching process provided to speed up information retrieval as perceived by the user.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for improving user perceived response time when retrieving information from a network based information system, comprising:

a computer; and a memory medium storing a program for retrieving a body of information from said information system in response to a user retrieval request, said body of information containing one or more identifiers that point to one or more other bodies of information, respectively; and wherein the computer is configured to execute a process for identifying another body of information based on said one or more identifiers and retrieving said another body of information from the information system before said another body of information is requested by said user.

2. Apparatus of claim 1 wherein the computer is configured to execute the process as part of said program.

3. Apparatus of claim 1 wherein the computer is configured to execute the process as part of an operating system.

4. Apparatus of claim 1 wherein the computer is configured to execute the process as part of a network operating system.

5. Apparatus of claim 1 wherein the computer is configured to execute the process as part of a network protocol stack.

6. Apparatus of claim 1 wherein the computer is further configured to operate as a controller on a network interface card.

7. Apparatus of claim 1 wherein the computer is further configured to operate an information proxy.

8. Apparatus of claim 1 wherein the computer is further configured to operate a front end of an information retrieval system.

9. Apparatus of claim 1 wherein the process is configured to implement functions for user interface, data retrieval, cache storage and look-ahead cache management.

10. Apparatus of claim 1 wherein said one or more identifiers specify respective network locations of said one or more other bodies of information.

11. Apparatus of claim 10 wherein said one or more identifiers specify at least one of a retrieval protocol, an information link type, and a file type by extension.

12. Apparatus of claim 10 wherein said identifying said another body of information includes identifying said another body information further based on past behavior of one or more users.

13. Apparatus of claim 1, wherein said identifying said another body of information based on said one or more identifiers includes:

retrieving one or more additional bodies of information based on one or more additional identifiers contained in retrieved bodies of information; and identifying said another body of information based one of said one or more other additional identifiers.

14. Apparatus of claim 13 wherein said identifying said another body of information is based at least in part on a depth first ordering of said one or more additional identifiers.

15. Apparatus of claim 13 wherein said identifying said another body of information is based at least in part on a breadth first ordering of said one or more additional identifiers.

16. Apparatus of claim 13 wherein said identifying said another body of information is based at least in part on a depth first and in part on a breadth first ordering of said one or more additional identifiers.

17. Apparatus of claim 1 wherein the memory medium further stores a data structure containing identifiers specifying bodies of information to be preloaded.

18. Apparatus of claim 1, wherein the body of information comprises a document.

19. A method for improving user perceived response time when retrieving information from an information system, comprising the steps of:

retrieving a body of information from the information system based on a retrieval request by a user;

extracting an identifier contained in the body of information, said identifier pointing to another body of information; and preloading said another body of information identified by the identifier before said another body of information is requested by the user.

20. The method of claim 19, further comprising the step of extracting one or more additional identifiers that point to one or more additional bodies of data from preloaded bodies of information.

21. The method of claim 19 further comprising:

extracting a plurality of identifiers from the body of information;

organizing the plurality of identifiers as part of a data structure; and fetching at least some of the identifiers from the data structure in an order corresponding to a desired preload order for retrieval.

22. The method of claim 21 further comprising the step of organizing additional identifiers from preloaded bodies of information as part of said data structure.

23. The method of claim 22 further comprising the step of excluding certain types of identifiers from the data structure based on any of a retrieval protocol, an information link type, and a file type by extension of the identifiers.

24. The method of claim 22 comprising organizing the identifiers by identifier type in said data structure to give priority to certain types of information identified by information link type.

25. The method of claim 21 further comprising stopping said preloading once:

an amount of time elapsed since a last user request exceeds a first threshold, a number of pre-load retrievals of information identified in said data structure exceeds a second threshold, or an aggregate amount of data preloaded exceeds a third threshold.

26. The method of claim 19 further comprising checking local information to see if an identified body of information is present locally before retrieving the identified body of information.

27. The method of claim 26 wherein the local information is stored locally by a plurality of users in common storage.

28. The method of claim 19 further comprising the step of checking network traffic levels to inhibit pre-loading of information when traffic levels are above a particular level or a rate at which information is preloaded exceeds a configured threshold.

29. A system for improving user perceived response time when retrieving information over a network, comprising:

a network;

at least one computer configured for delivering a body of information over said network upon request, said body of information containing one or more identifiers that point to one or more other bodies of information, respectively; and at least one computer operated by a user configured for accessing the body of information over said network, said at least one computer operated by a user for identifying another body of information based on said one or more identifiers and retrieving said another body of information over said network before said another body of information is requested by said user.

30. The system of claim 29 wherein the computer operated by said user includes a memory medium for storing said another body of information.

31. The system of claim 30 wherein the computer operated by said user is further configured for displaying said another body of information to said user when requested without network retrieval.

32. A computer program product for improving user perceived response time when retrieving information from an information system, comprising:

a memory medium; and a computer program stored on said memory medium, said computer program including instructions for extracting identifiers from a body of information requested by a user, said identifiers pointing to other bodies of information, respectively and for preloading at least one of the other bodies of information based on at least one of the identifiers respectively before said at least one of the other bodies of information is requested by the user.

33. The computer program product of claim 32 wherein said computer program includes a user interface module, a data retrieval module, a cache storage module and a look-ahead cache control module.

34. The computer program product of claim 32 wherein said computer program further includes instructions for organizing said identifiers into a data structure and for fetching identifiers from the data structure in an order corresponding to a desired preload order for retrieval.

35. The computer program product of claim 34 wherein identifiers contained in preloaded bodies of information are also organized as part of said data structure based on any of a retrieval protocol, an information link type, and a file type by extension of the identifiers.

36. The computer program product of claim 34 wherein identifiers of certain types are excluded from the data structure.

* * * * *